US006264039B1

(12) United States Patent
Chyi

(10) Patent No.: US 6,264,039 B1
(45) Date of Patent: Jul. 24, 2001

(54) METHOD FOR PRECIOUS METAL RECOVERY FROM SLAG

(75) Inventor: Lindgren L. Chyi, Fairlawn, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 09/425,144

(22) Filed: Oct. 21, 1999

(51) Int. Cl.$^7$ .......................................................... B03B 7/00
(52) U.S. Cl. ............................. 209/18; 209/13; 209/645; 209/172; 209/172.5; 209/173; 241/24.1; 241/24.25; 241/29
(58) Field of Search ................................. 209/13, 18, 629, 209/645, 422, 932; 241/24.1, 29

(56) References Cited

U.S. PATENT DOCUMENTS

| | | | |
|---|---|---|---|
| 3,979,205 | 9/1976 | Wanzenberg | 75/10 |
| 4,268,363 | 5/1981 | Coughlin | 204/39 |
| 4,356,030 | 10/1982 | Halpin et al. | 75/21 |
| 4,404,022 | * 9/1983 | Godbehere | 75/2 |
| 4,427,442 | 1/1984 | Day | 75/10 |
| 4,451,289 | 5/1984 | Van Hecke et al. | 75/63 |
| 4,451,290 | 5/1984 | Hill et al. | 75/63 |
| 4,588,436 | 5/1986 | Eriksson et al. | 75/10 |
| 4,613,365 | 9/1986 | Berg et al. | 75/83 |

(List continued on next page.)

OTHER PUBLICATIONS

Chyi, L.L., and Crocket, J.H., 1976, Partition of platinum, palladium, iridium, and gold among coexisting minerals from the deep ore zone, Strathcona mine, Sudbury, Ontario, Economic Geology, v. 71, p. 1196–1205.

Chyi, Lindgren L., 1980, The distribution of gold and platinum in bituminous coal, 26$^{th}$ International Geological Congress, Abstracts, section 10, p. 767.

Chyi, Lindgren L., 1982, The distribution of gold and platinum in bituminous coal, Economic Geology, v. 77, p. 1592–1597.

Chyi, Lindgren L., 1982, Preliminary study of combustion behavior of pyrite in lignite, Third Conference on Inorganic Constituents in Coal, Abstracts of Presentation.

Chyi, Lindgren L., and Runyon, C.V., 1992, Assessment of clean coal technology, in Energy, Environment, and Information Management, H. Wang, S.L. Chang, and H.C. Lee, eds., Argonne National Laboratory, p. 2/27–2/33.

Crocket, J.H., and Chyi, L.L., 1972, Abundances of Pd, Ir, Os, and Au in an Alpine ultramafic pluton, 24$^{th}$ International Geological Congress, Abstracts, section 10, p. 202–209.

(List continued on next page.)

*Primary Examiner*—Donald P. Walsh
*Assistant Examiner*—Mark J. Beauchaine
(74) *Attorney, Agent, or Firm*—Renner, Kenner, Greive, Bobak, Taylor & Weber

(57) ABSTRACT

The present invention, therefore, provides stage crushing method for recovering precious metals from slag produced by a coal burning furnace or boiler comprising: a plurality of crushing steps, wherein each crushing step produces slag particles having successively smaller particle diameter sizes, said crushing steps continued until a final desired particle diameter sized is obtained; wherein each of said crushing steps is followed by suspending said crushed slag particles in a liquid medium to form a slurry of light-weight particles and heavy weight-particles and allowing the crushed slag particles within the slurry to separate, based on weight of the particles, thereby forming a light-weight particle population and a heavy-weight particle population; wherein each suspending step is followed by removing said light-weight particles from said slurry, such that said slurry consists of substantially heavy-weight particles; and collecting said heavy-weight particles.

24 Claims, 1 Drawing Sheet

U.S. PATENT DOCUMENTS

| | | | |
|---|---|---|---|
| 4,685,963 | 8/1987 | Saville | 75/10.19 |
| 4,705,563 | 11/1987 | Poeppel et al. | 75/95 |
| 4,717,419 | 1/1988 | Makinen et al. | 75/24 |
| 4,765,827 | 8/1988 | Clough et al. | 75/2 |
| 4,800,017 | 1/1989 | Krishnaswamy et al. | 210/219 |
| 4,857,203 | 8/1989 | Pope et al. | 210/681 |
| 4,892,631 | 1/1990 | White | 204/109 |
| 4,997,532 | 3/1991 | Flax | 204/105 |
| 5,094,746 | 3/1992 | Bush | 209/167 |
| 5,123,956 | 6/1992 | Fernandez et al. | 75/423 |
| 5,133,506 | 7/1992 | Bogen | 241/46.17 |
| 5,160,035 | 11/1992 | McConnell | 209/439 |
| 5,232,490 | 8/1993 | Bender et al. | 75/733 |
| 5,238,485 | 8/1993 | Shubert | 75/421 |
| 5,279,644 | 1/1994 | Francisco | 75/631 |
| 5,324,341 | 6/1994 | Nagel et al. | 75/503 |
| 5,336,474 | 8/1994 | Diehl et al. | 423/29 |
| 5,338,338 | 8/1994 | Kohr | 75/711 |
| 5,364,453 | 11/1994 | Kohr | 75/711 |
| 5,443,621 | 8/1995 | Kohr | 75/711 |
| 5,626,647 | 5/1997 | Kohr | 75/711 |
| 5,632,382 * | 5/1997 | Patrick et al. | 209/173 |
| 5,651,465 * | 7/1997 | Schmidt et al. | 209/12.2 |
| 5,900,604 * | 5/1999 | McNeill | 209/164 |

OTHER PUBLICATIONS

Page, N.J., 1988, Thoughts on permissive environments for platinum–group elements deposits–conventional and unconventional, V.M. Goldschmidt Conference, Program and Abstracts, p. 65.

Samaniego, C.M., and Chyi, L.L., 1989, Trace element distribution in Keystone vein of Antamok gold deposits in Luzon, Northern Philippines, and their genetic implications, $28^{th}$ International Geological Congress, Abstracts, v. 3, p. 15.

Stone, W.E., and Crocket, J.H., 1993, Determination of noble and allied trace metals using radiochemical neutron activation analysis with tellurium coprecipitation, Chemical Geology, v. 106, p. 219–228.

Derwent WPI Acc. No. 1999–459676/199939, English language abstract for DE 19805893.

Derwert WPI Publication No. XP–002159422, English language abstract abstract for CN 1113833.

Derwert WPI Publication No. XP–002159423, English language abstract for JP 60135533.

Derwert WPI Publication No. XP–0002159424, English language abstract for RU 2074340.

Derwert WPI Publication No. XP–002159428, English language abstract for AU 8434764.

* cited by examiner

METHOD FOR PRECIOUS METAL RECOVERY FROM SLAG

TECHNICAL FIELD OF THE INVENTION

The present invention is directed to a method for extraction and recovery of precious metals. The present invention is more particularly directed to a stage crushing method for the extraction and recovery of precious metals from slag produced by a coal burning furnaces and boilers.

BACKGROUND OF THE INVENTION

Precious metals are of significant technological importance. They include elements such as platinum, gold, ruthenium, rhodium, palladium, rhenium, iridium, osmium and the like. The technological importance of precious metals is illustrated by their many and diverse applications in the areas of catalysis, electronics, and jewelry. The oxidation resistance of these precious metals makes them useful for high temperature applications. In metallic form, precious metals are biocompatible as well as highly corrosion resistant. This makes them useful in medical devices and dental applications. Precious metals are extremely rare, due to their low natural abundance, and the complex processes required for their extraction and refining.

Fossil fuels, such as coal, are typically used in furnaces and boilers to produce steam and ultimately electricity for industrial purposes. The steam is typically used to drive the generators and produce electricity. Although steam is the intermediate product that is required to ultimately produce power, combustion by-products result from the burning of coal in the boilers.

One type of coal burning boiler is the cyclone furnace. The cyclone furnace is a slow-heating, water-cooled furnace having a horizontal cylindrical shape in which a fossil fuel, such as coal, is fired cyclonically. As the coal is burned in the boiler, heat is produced to boil water circulating through tubes that are positioned about the outer circumference of the boiler. This process produces steam which is required to ultimately produce electricity.

The coal combustion process results in the production of by-products, such as slag. Slag comprises the molten impurities of the coal combustion process, including oxides, silicates and iron metal. The slag is collected in a collection tank under the coal burning furnace. The slag from the coal burning furnace is a potential source of precious metals, such as platinum, gold, ruthenium, rhodium, palladium, rhenium, iridium and osmium. The large quantity of cyclone slag produced is available for precious metal extraction and recovery at a low cost.

There are recovery methods known in the prior art that pertain to recovering precious metals from complex or carbonaceous ores, metal smelting slag, and used catalysts. They include electrochemical methods, pyrometallurgical methods which use reducing agents and heat-treatment, complexing agents such as cyanides, and leaching methods of recovery utilizing various acid solutions. In U.S. Pat. No. 4,268,363, to Coughlin et al. discloses electrochemical gasification of carbonaceous materials to produce oxides of carbon at the anode, and hydrogen or metallic elements, including precious metals, at the cathode of an electrolysis cell.

U.S. Pat. No. 4,997,532, to Flax et al., describes a method in which noble metals are extracted from raw materials by first leaching the materials with mineral acid (leaving the noble metals in the residue), then treating the residue with a non-aqueous liquid containing bromine to form a complex of the formula R[MeBrx], and subjecting this complex to electrolysis whereby the noble metal is deposited on the cathode.

Precious metals are recovered from iron-bearing slags created in nickel and copper smelting processes by a method disclosed in U.S. Pat. No. 4,717,419. The slags are treated under reducing conditions at temperatures of 1100–1400° C., then further reduced by sulphidization. The molten slag is then cooled under controlled conditions. After crushing and grinding, the precious metals, which have been concentrated into the iron-base metal phase, can be separated by means of magnetic separation.

U.S. Pat. No. 5,238,485 to Shubert et al., discloses that precious metals can be recovered from complex ores by heating the ore to the molten state with a reducing agent, fluxing agent, and an iron-embrittling agent. After cooling, the precious metals are separated through use of an electrolytic process or selective chemical dissolution.

Kohr discloses a method in U.S. Pat. No. 5,626,647 in which precious metals are recovered from carbonaceous ore by means of a leach solution containing cyanide, aqua regia or thiourea.

U.S. Pat. No. 4,404,022, to Godbehere, is directed toward a method for treating dore slag. Dore slag is slag from a dore furnace, which is used to smelt slime material from the electrolytic refining of copper, to produce dore metal, consisting essentially of silver and gold. The method comprises the steps of grinding the slag, mixing the obtained pulp with water to form a slurry, adding a suitable collector, such as sodium di-isobutyl dithiophosphate, adding a suitable frother, such as methyl iso-butyl carbinol, aerating the slurry, and separating the precious metals-containing froth from the remainder of the slurry There are problems with each of the methods cited in the known prior art. There are safety issues raised when using strong mineral acid compounds. Specialized equipment is required for electrochemical treatment or electrolysis. Large furnaces are needed to heat slag to the molten state. Frother and collection compounds can be both toxic and costly. It is still desirable to develop a method to recover precious metal from slag produced by a coal burning furnace which does not require electrolysis or the addition of concentrated, toxic, and costly chemical reagents, which does not require heating the slag, and which will be economically and environmentally more desirable.

The United States, which currently imports a large percentage of its precious metal requirements, will be increasingly less dependent on foreign supplies of precious metals. The recovery of precious metals from coal furnace slag will help to reduce the need for mining and, thus, reduce associated environmental problems. In addition, the current cost of disposing of coal burning cyclone furnace slag will be somewhat mitigated by the realization of the value of the precious metal content of the slag.

SUMMARY OF THE INVENTION

It is, therefore, an object of the present invention to provide a stage crushing method for the extraction and recovery of precious metals from slag produced by coal burning furnaces or boilers.

It is a further object of the present invention to provide a stage crushing method for the extraction and recovery of precious metals from slag produced by coal burning furnaces or boilers that is more environmentally sound than the current extraction and recovery techniques.

It is a further object of the present invention to provide a stage crushing method for the extraction and recovery of precious metals from slag produced by coal burning furnaces or boilers that is cost effective.

The foregoing objects, together with the advantages thereof over the known art relating to methods of precious metal recovery, which shall become apparent from the specification which follows, are accomplished by the invention as hereinafter described and claimed.

The present invention, therefore, provides stage crushing method for recovering precious metals from slag produced by a coal burning furnace or boiler comprising: a plurality of crushing steps, wherein each crushing step produces slag particles having successively smaller particle diameter sizes, said crushing steps continued until a final desired particle diameter sized is obtained; wherein each of said crushing steps is followed by suspending said crushed slag particles in a liquid medium to form a slurry of light-weight particles and heavy weight-particles and allowing the crushed slag particles within the slurry to separate, based on weight of the particles, thereby forming a light-weight particle population and a heavy-weight particle population; wherein each suspending step is followed by removing said light-weight particles from said slurry, such that said slurry consists substantially of heavy-weight particles; and collecting said heavy-weight particles.

In a preferred embodiment, the present invention provides a method for recovering precious metals from slag from a coal burning furnace or boiler comprising the steps of: crushing slag that has been collected from a coal burning furnace or boiler to form crushed slag particles having a first particle diameter size; suspending the crushed slag particles in an liquid medium to form a slurry of crushed slag particles, wherein the slurry contains light-weight particles and heavy-weight particles, said light-weight particles and heavy-weight particles having said first particle diameter size; allowing the crushed slag particles within the slurry to separate, based on weight of the particles, thereby forming a light-weight particle population and a heavy-weight particle population; removing the light-weight particles form the slurry; collecting and drying the heavy-weight particles;

recrushing the heavy-weight particles to form crushed slag particles having a second particle diameter size, wherein said second particle diameter size is less than said first particle diameter size; resuspending the crushed slag particles in an liquid medium to form a slurry of crushed slag particles, wherein the slurry contains light-weight particles and heavy-weight particles, said light-weight particles and heavy-weight particles having said second particle diameter size; allowing the crushed slag particles within the slurry to separate, based on weight of the particles, thereby forming a light-weight particle population and a heavy-weight particle population; removing the light-weight particles from the slurry; collecting and drying the heavy-weight particles;

recrushing the heavy-weight particles to form crushed slag particles having a third particle diameter size, wherein said third particle diameter size is less than said second particle diameter size; resuspending the crushed slag particles in an liquid medium to form a slurry of crushed slag particles, wherein the slurry contains light-weight particles and heavy-weight particles, said light-weight particles and heavy-weight particles having said third particle diameter size; allowing the crushed slag particles within the slurry to separate, based on weight of the particles, thereby forming a light-weight particle population and a heavy-weight particle population; removing the light-weight particles from the slurry;

continuing the suspending said light-weight particles and heavy-weight particles having said third particle diameter size and removing of light-weight particles until the slurry substantially consists of heavy-weight particles.

BRIEF DESCRIPTION OF THE DRAWINGS

FIG. Nos. 1 and 2 are photomicrographs of a fused heavy-weight iron metal particle having a diameter of about 1 millimeters comprising smaller particles that are recovered from slag from a coal burning cyclone boiler. The fused iron particle has precious metals associated therewith. Some uncombusted coal is present.

DETAILED DESCRIPTION OF THE INVENTION

Figure 1:
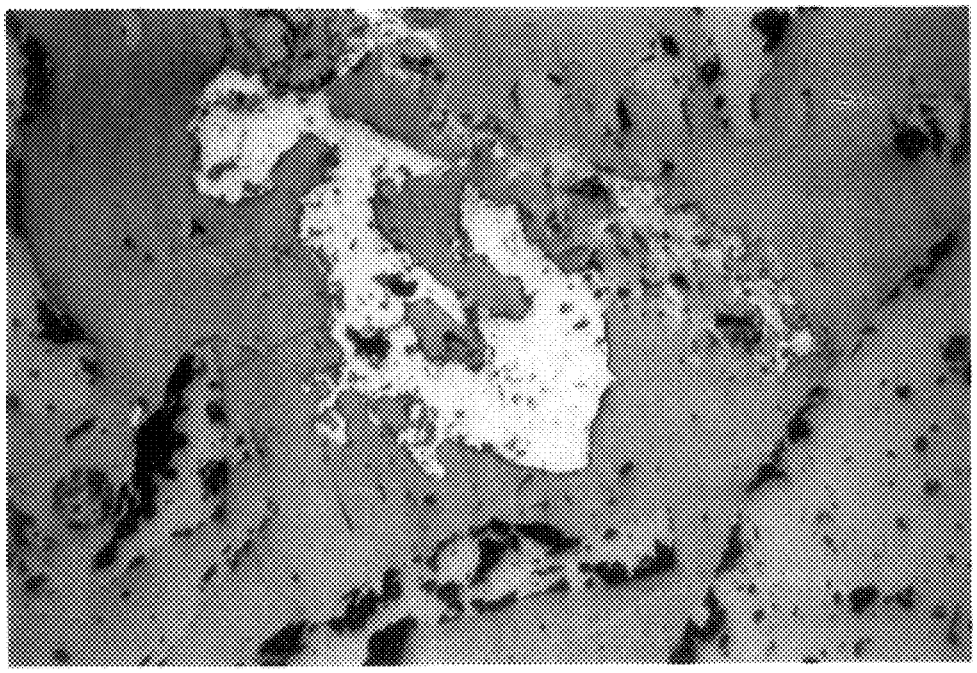
Figure 2:
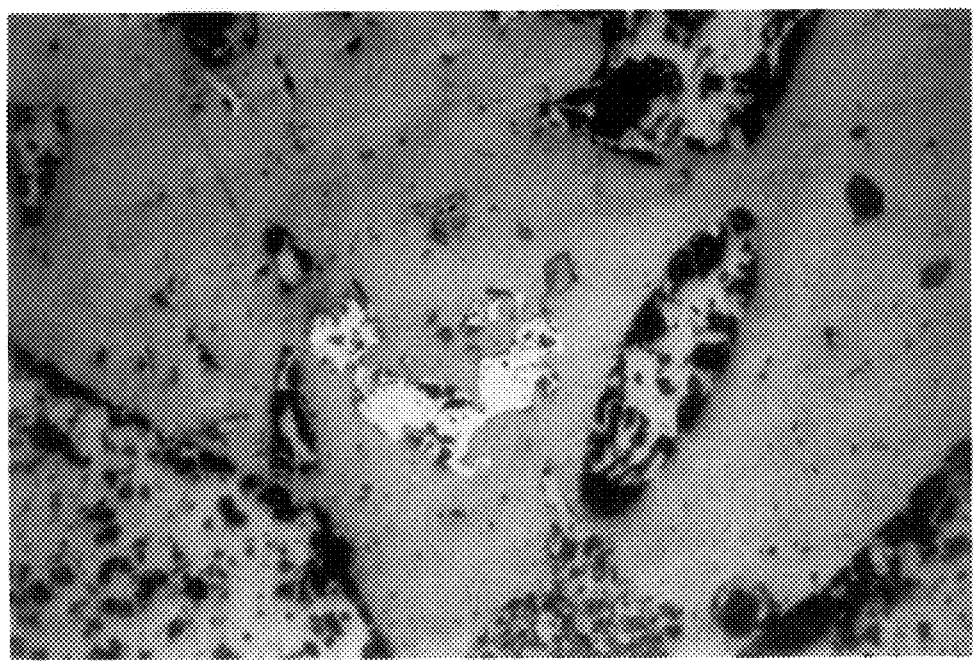

As coal is combusted in a coal-burning furnace or boiler, the coal is gasified, however, the mineral content of the coal remains behind as a molten ash, or slag. The slag, contains a heavy-metal iron phase having precious metals associated therewith. In addition, the slag also contains various light-weight, brittle silicate and inorganic oxide compounds. Traditionally, the slag produced from the coal combustion process is collected, cooled by quenching and disposed in land fills.

The present invention provides an environmentally sound and cost effective method for the recovery of precious metals from slag which has been produced as a by-product of coal combustion. The inventive method utilizes a stage crushing method to recover precious metals from quenched slag produced as a by-product of the combustion of coal in a coal-burning furnace or boiler.

During the coal combustion process, it is known that precious metals in the coal become intimately associated with the heavy-metal iron phase. The precious metals recovered from the slag are at least one member selected from the group consisting of platinum, gold, ruthenium, rhodium, palladium, rhenium, iridium, and osmium. The method of the present invention employs a controlled stage crushing method, which is required to liberate the precious metals that are held in the heavy-metallic iron phase produced during the coal combustion process.

The process of the present invention is premised on the fact that, upon coal combustion by a coal burning furnace or boiler, preferably a cyclone boiler, precious metals become intimately associated with the heavy metal iron phase of the molten slag. Once the slag has been cooled in the water-filled collection tank, the iron phase remains ductile and, thus remains larger in size with respect to the brittle silicate matrix or phase. Therefore, the heavy-metal particle population, containing the ductile iron phase with precious metals intimately associated therewith, can be easily separated from the light-weight oxide and silicate population or phase.

The present invention provides a stage crushing method for recovering precious metals from slag produced by a coal burning furnace or boiler. The stage crushing method of the present invention comprises a plurality of crushing steps. Each crushing step produces slag particles having successively smaller particle diameter sizes and is continued until a desired final particle size is obtained. Each crushing step is followed by suspending the crushed slag particles in a liquid medium to form a slurry of light-weight particles and heavy weight-particles. The crushed slag particles within the slurry are allowed to separate, based on weight of the particles, thereby forming a light-weight particle population and a heavy-weight particle population. Each suspending step is followed by removal of the light-weight particles from the slurry, such that said slurry consists of substantially heavy-weight particles. The heavy-weight particles containing the precious metals are collected.

In one embodiment, the slag is subjected to a stage crushing method comprising three separate crushing steps. The slag is crushed into particles having a first particle diameter size. In one preferred embodiment, the first particle diameter size is about less than 150 microns. These slag particles are then suspended in an liquid medium to form an slurry of slag particles. The slurry contains light-weight particles, which substantially include the silicate and oxide compounds, and heavy-weight particles, which substantially include the heavy metal iron having the precious metals associated therewith. The crushed slag particles within the slurry are allowed to separate, based on weight of the particles, thereby forming a light-weight particle population and a heavy-weight particle population. The light-weight particles are then separated from the heavy-weight particles by removal from the slurry. The heavy-weight particles are collected and dried.

The dried heavy-weight slag particles are then subjected to a second stage of crushing to form particles having a second particle size diameter, which is less than the first particle diameter size. In one preferred embodiment, the second particle diameter size is less than about 75 microns. As described above, these further crushed slag particles are then suspended in a liquid medium to form a second slurry of crushed slag particles. This second slurry contains light-weight particles and heavy-weight particles. The slag particles are allowed to separate, based on weight of the particles, thereby forming a light-weight particle population and a heavy-weight particle population. The light-weight particles are separated from the heavy-weight particles by removal from the slurry. The heavy-weight particles are again collected and dried.

The dried heavy-weight slag particles are then subjected to the third and final stage of crushing to form particles having a third particle diameter size, which is less than the second particle diameter size. In one preferred embodiment, the third particle diameter size is preferably less than about 10 microns. As described above, these further crushed slag particles are then suspended in a liquid medium to form a third slurry of crushed slag particles. This third slurry contains light-weight particles and heavy-weight particles. The slag particles are allowed to separate, based on weight of the particles, thereby forming a light-weight particle population and a heavy-weight particle population. The light-weight particles are separated from the heavy-weight particles by removal from the slurry. The heavy-weight particles are again collected.

These crushed slag particles having a diameter of less than about 10 micrometers, are essentially in a powder form. The powdered slag particles are subsequently suspended in a liquid media. Any remaining lighter-weight particles are allowed to separate, on the basis of weight, from the iron phase heavy-metal particles. The suspension of slag particles in a liquid media and removal of lighter-weight particles is repeated until the slurry substantially consists of heavy-weight particles, which are then collected and dried. These heavy-weight iron-containing particles have precious metals associated therewith.

It is envisioned that slag from many different species of coal may be used in the present invention. Suitable species of coal include bituminous coal, sub-bituminous coal, lignite and anthracite. The most preferred species of coal that may be utilized is bituminous coal.

There are different types of boilers and furnaces that are used for coal combustion. Slag from coal burning cyclone furnaces and boilers is employed in the present invention. The preferred slag is a by-product of coal combustion from a horizontally positioned cyclone furnace. The horizontally disposed cyclone boiler is designed specifically for the burning of low grade coal and ranks of high-ash, low-fusion temperature coal. See Kirk-Othmer, *The Concise Encyclopedia of Chemical Technology*, $4^{th}$ Edition, John Wiley & Sons, Inc., 1999, pp 464–465, for a further discussion of coal combustion and furnaces.

As discussed hereinabove, slag from a cyclone boiler is preferably used in the precious metal recovery method of the present invention. The cyclonic combustion process is important to precious metal concentration in the slag by-products of coal combustion. The cyclone boilers do not drive the precious metals out of the stack, but rather the cyclone combustion process concentrates the precious metals in the molten iron phase of the slag. The molten slag from the cyclone burning process is then drained into a water filled slag collection tank. Therefore, slag from a coal burning cyclone furnace is most preferred.

As mentioned hereinabove, the present method for recovery of precious metals is based on a controlled stage crushing or grinding of the dried slag from the coal burning boiler. The grinding or crushing of the slag can be accomplished by any suitable means of crushing or grinding, including, but not limited to, jaw-type crushers, gyratory-type crushers for coarse crushing, and ball-milling for pulverizing. The most preferred method of crushing for coarse crushing of the dried slag particles is jaw-crushing. The most preferred method of pulverizing the dried slag particles is by convention ball-milling.

As mentioned hereinabove, the crushed slag particles are suspended in a liquid media to facilitate the separation of the light-weight particles, substantially containing the brittle silicates and oxides from the heavy-weight particles, substantially containing the iron phase with precious metal associated therewith.

Liquids such as water and heavy liquids can be used to suspend the crush slag particles and facilitate separation. Heavy liquids include heavy inorganic salt solutions and heavy organic solvents. The term "heavy liquids", as used herein refers to any liquid having a specific gravity of greater than 1.0, and which are commonly used for separation of minerals. Suitable heavy inorganic salt solutions include, sodium chloride, calcium chloride, zinc chloride, Sonstadt solution, which is an aqueous solution of mercuric potassium iodide, Klein solution, which is an aqueous solution of cadmium borotungstate, and Rohrbach solution, which is an aqueous solution of barium mercuric iodide.

Suitable heavy organic solvents include bromoform, tetrabromoethane, Braun solution, which is diiodomethane, and Clerici solution, which is an solution of thallium formate and malonate. Because of economy and environmental concerns, the most preferred liquid medium that is used to suspend the crushed slag particles is water.

Once the lighter-weight particle population has separated from the heavy-weight particle population, the heavy-weight particles are collected for drying and subsequent crushing. The separation of the iron-containing heavy-weight particles is accomplished by any known means of separating including, but not limited to, hydrocyclone collection technique, dynawhirlpool separation technique, and density control techniques with or without magnetic separators, and the like. Application of magnetic field separation is a preferred method to accelerate the separation of the lighter-weight particles from the iron-containing heavy weight particles having a particle diameter size of less than about 10 microns.

The drying of the crushed heavy-weight slag particles is accomplished by any known means of drying. Suitable drying methods include, but are not limited to air drying and oven drying. Air drying the crushed slag particles is obviously more economically sound.

In addition, froth floatation techniques employing surfactants may be useful to separation and removal of the light-weight brittle silicate particle population form the heavy-weight iron phase particles.

The dried slag from cyclone boilers is a source of precious metals such as, platinum, gold, ruthenium, rhodium, palladium, rhenium, iridium and osmium. The technological importance of precious metals is illustrated by their many and diverse applications in the areas of catalysis, electronics, and jewelry. The oxidation resistance of these precious metals makes them useful for high temperature applications. In metallic form, precious metals are biocompatible as well as highly corrosion resistant. This makes them useful in medical devices and dental applications. Precious metals are extremely rare, due to their low natural abundance, and the complex processes required for their extraction and refining.

One precious metal in particular, platinum, is useful as a catalyst in oil refining, as a catalytic converter material in automobiles, a catalyst in hydrocarbon burning, a catalyst in many chemical industries and to some extent as a chemotherapeutic agent for cancer patients.

The method of the present invention is more sensitive to the coal combustion technology used, as compared to the type of coal employed. Therefore, the slag from most types of coal is preferable for precious metal extraction and recovery according to the method of the present invention.

Although the methods of the present invention have been described with reference to a small-scale extraction and recovery process, it is envisioned that the methods of the present invention can be easily utilized in a large-scale industrial setting.

The examples below are intended to be illustrative of the methods of precious metal extraction of the present invention, but should not be considered to limit the methods of the present invention in any way.

GENERAL EXPERIMENTAL

Example 1

Slag from a coal burning cyclone furnace was subjected to the precious metal recovery process of the present invention. Briefly, about 1 kilogram of quenched slag was collected and air dried. The dried slag was crushed to form slag particles having a diameter of less than about 150 micrometers. This was accomplished by first using jaw-type crushing to crush the dried slag to less than about 5 millimeters (mm), followed by grinding the slag particles to less than about 150 micrometers.

The crushed slag particles were placed into a large glass cylinder, and were subsequently suspended in a water to form a slurry of crushed slag particles. The slurry consisted of a light-weight particle population, containing brittle silicates and oxides, and a heavy-weight particle population, containing iron metal having precious metals associated therewith, the particles having a particle diameter size of less than about 150 microns. The slurry of crushed slag particles was allowed to separate, based on weight of the particles, thereby forming a light-weight particle population at the upper surface of the cylinder, and a heavy-weight particle population at the bottom surface of the cylinder. The lighter-weight particle population was removed from the slurry by decanting. The heavy-weight particles were collected and dried.

The heavy-weight particles were subjected to a second crushing to form crushed slag particles having a diameter of less than about 75 micrometers. The crushed slag particles were again placed into a large glass cylinder, and were subsequently suspended in a water to form a slurry of crushed slag particles. The slurry consisted of a light-weight particle population, containing brittle silicates and oxides, and a heavy-weight particle population, containing iron metal having precious metals associated therewith. The slurry of crushed slag particles was allowed to separate, based on weight of the particles, thereby forming a light-weight particle population at the upper surface of the cylinder, and a heavy-weight particle population at the bottom surface of the cylinder. The lighter-weight particle population was removed from the slurry by decanting. The heavy-weight particles were collected and dried.

The heavy-weight particles were subjected to a third crushing to form crushed slag particles having a diameter of less than about 10 micrometers. The crushed slag particles were again placed into a large glass cylinder, and were subsequently suspended in a water to form a slurry of crushed slag particles. The slurry consisted of a light-weight particle population, containing brittle silicates and oxides, and a heavy-weight particle population, containing iron metal having precious metals associated therewith. The slurry of crushed slag particles was allowed to separate, based on weight of the particles, thereby forming a light-weight particle population at the upper surface of the cylinder, and a heavy-weight particle population at the bottom surface of the cylinder. The lighter-weight particle population was removed from the slurry by decanting. The slurry of slag particles was subjected to repeated suspension and removal of lighter-weight particles until the slurry substantially consisted of heavy-weight particles only.

The heavy-weight particles of the slurry were collected and dried. The dried heavy-weight particles were analyzed by inductively coupled plasma mass spectrometry (ICP-MS) for the level of different precious metals, including platinum, gold, ruthenium, rhodium, palladium, rhenium, iridium and osmium contained therein. The results of the analysis of the heavy-weight particles is shown in Table I, below.

TABLE I

| PRECIOUS METAL | CONCENTRATION IN SLAG (PPM) |
|---|---|
| Platinum | 1,400 |
| Gold | 0.2 |
| Ruthenium | 0.003 |
| Rhodium | 0.03 |
| Palladium | 0.026 |
| Rhenium | 0.02 |
| Iridium | 0.024 |
| Osmium | <0.003 |

As shown in Table I, above, about 1 kilogram of quenched slag from a coal burning cyclone furnace yields about 1,400 ppm platinum, about 0.2 ppm gold, about 0.003 ppm ruthenium, about 0.03 ppm rhodium, about 0.026 ppm palladium, about 0.002 rhenium, about 0.024 iridium and about 0.003 osmium.

Thus, it should be evident that the method of the present invention is highly effective in recovering and collecting precious metals from quenched slag produced from the combustion process of the coal in a coal-burning furnace. The method of the present invention is particularly useful for the recovery of precious metals from quenched slag produced in coal burning cyclone furnaces and boilers.

Problems encountered with methods known in the prior art, such as the hazards of treating the slag particles with strong mineral acids can be avoided with the method of the current invention. The current invention does not require electrochemical treatment or an electrolysis cell. The current invention obviates the need for heating the slag to the molten state, an expensive process, and also eliminates the step of sulphidization. The current invention, because it does not require electrolysis or the addition of concentrated, toxic, and costly chemical reagents, is economically and environmentally more desirable.

Based upon the foregoing disclosure and description, it should now be apparent that the use of the described method will carry out the objects set forth hereinabove. It is, therefore, to be understood that any variations evident fall within the scope of the claimed invention and this, the selection of slag source, furnace or boiler type, liquid media, crushing techniques and drying techniques can be determined without departing from the spirit of the invention herein disclosed and described. Thus, the scope of the invention shall include all modification and variations that may fall within the scope of the claims.

I claim:

1. A stage crushing method for recovering precious metals from slag produced by a coal burning furnace or boiler comprising:
    a plurality of crushing steps, wherein each crushing step produces slag particles having successively smaller particle diameter sizes, said crushing steps continued until a final desired particle diameter size is obtained;
    wherein each of said crushing steps is followed by suspending said crushed slag particles in a liquid medium to form a slurry of light-weight particles and heavy weight-particles and allowing the crushed slag particles within the slurry to separate, based on weight of the particles, thereby forming a light-weight particle population and a heavy-weight particle population;
    wherein each suspending step is followed by removing said light-weight particles from said slurry, such that said slurry contains substantially heavy-weight particles; and
    collecting said heavy-weight particles.

2. The method of claim 1, wherein said coal-burning furnace is a coal burning cyclone furnace.

3. The method of claim 1, wherein said slag is quenched prior to collection.

4. The method of claim 1, wherein said slurry of crushed slag particles is agitated to facilitate settling of said heavy-weight particles before said lighter-weight particles are removed.

5. The method of claim 1, wherein said method further comprises the use of surfactants to facilitate separation of said heavy-weight particles before said lighter-weight particles are removed.

6. The method of claim 1, wherein said heavy-weight particles having said third particle diameter size are separated from said light-weight particles having said third particle diameter size by application of a magnetic field to said slurry.

7. The method of claim 1, wherein the crushing is accomplished by a means selected from the group consisting of jaw-type crushing, gyratory-type crushing and ball-milling.

8. The method of claim 1, wherein said liquid is selected from the group consisting of water and heavy liquids.

9. The method of claim 8, wherein said heavy liquids are selected from the group consisting of heavy organic solvents and heavy inorganic salt solutions.

10. The method of claim 9, wherein said heavy organic solvents are selected form the group consisting of bromoform, tetrabromoethane, diiodomethane and a solution of thallium formate and malonate.

11. The method of claim 9, wherein said heavy salt solutions are selected from the group consisting of mercuric potassium iodide, cadmium borotungstate, barium mercuric iodide, sodium chloride, calcium chloride and zinc chloride.

12. The method of claim 1, wherein the precious metal is at least one member selected from the group consisting of platinum, gold, ruthenium, rhodium, palladium, rhenium, iridium, and osmium.

13. The stage crushing method of claim 1, comprising:
    crushing slag that has been collected from a coal burning furnace to form crushed slag particles having a first particle diameter size;
    suspending the crushed slag particles in a liquid medium to form a slurry of crushed slag particles, wherein the slurry contains light-weight particles and heavy-weight particles;
    allowing the crushed slag particles within the slurry to separate, based on weight of the particles, thereby forming a light-weight particle population and a heavy-weight particle population;
    removing the light-weight particle population from the slurry;
    collecting and drying the heavy-weight particle population;
    recrushing the heavy-weight particles to form crushed slag particles having a second particle diameter size, wherein said second particle diameter size is less than said first particle diameter size;
    resuspending the crushed slag particles in an liquid medium to form a slurry of crushed slag particles, wherein the slurry contains light-weight particles and heavy-weight particles;
    allowing the crushed slag particles within the slurry to separate, based on weight of the particles, thereby forming a light-weight particle population and a heavy-weight particle population;
    removing the light-weight particles form the slurry;
    collecting and drying the heavy-weight particles;
    recrushing the heavy-weight particles to form crushed slag particles having a third particle diameter size, wherein said third particle size is less than said second particle diameter size;
    resuspending the crushed slag particles in an liquid medium to form a slurry of crushed slag particles, wherein the slurry contains light-weight particles and heavy-weight particles;
    allowing the crushed slag particles within the slurry to separate, based on weight of the particles, thereby forming a light-weight particle population and a heavy-weight particle population;

removing the light-weight particles form the slurry;

continuing the suspending said light-weight and said heavy-weight particles having said third particle diameter size, and removing of lighter-weight particles until the slurry substantially consists of heavy-weight particles.

14. The method of claim 13, wherein said first particle diameter size is less than about 150 microns.

15. The method of claim 13, wherein said second particle diameter size is less than about 75 microns.

16. The method of claim 13, wherein said third particle diameter size is less than about 10 microns.

17. The method of claim 13, wherein said slurry of crushed slag particles is agitated to facilitate settling of said heavy-weight particles before said lighter-weight particles are removed.

18. The method of claim 13, wherein said method further comprises the use of surfactants to facilitate separation of said heavy-weight particles before said lighter-weight particles are removed.

19. The method of claim 13, wherein said heavy-weight particles having said third particle diameter size are separated from said light-weight particles having said third particle diameter size by application of a magnetic field to said slurry.

20. The method of claim 13, wherein the crushing is accomplished by a means selected from the group consisting of jaw-type crushing, gyratory-type crushing and ball-milling.

21. The method of claim 13, wherein said liquid is selected from the group consisting of water and heavy liquids.

22. The method of claim 21, wherein said heavy liquids are selected from the group consisting of heavy organic solvents and heavy inorganic salt solutions.

23. The method of claim 22, wherein said heavy organic solvents are selected from the group consisting of bromoform, tetrabromoethane, diiodomethane and a solution of thallium formate and malonate.

24. The method of claim 22, wherein said heavy salt solutions are selected from the group consisting of mercuric potassium iodide, cadmium borotungstate, barium mercuric iodide, sodium chloride, calcium chloride and zinc chloride.

* * * * *